(12) United States Patent
Tiwari

(10) Patent No.: US 6,799,015 B1
(45) Date of Patent: Sep. 28, 2004

(54) ELECTROMAGNETIC TRANSPONDER WITH A FREQUENCY DETUNING

(75) Inventor: Vineet Tiwari, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 554 days.

(21) Appl. No.: 09/718,452

(22) Filed: Nov. 21, 2000

(30) Foreign Application Priority Data

Nov. 30, 1999  (FR) ............................................. 99 15075

(51) Int. Cl.[7] ................................................. H04B 5/00
(52) U.S. Cl. .................. 455/41.1; 455/558; 340/310.07
(58) Field of Search .............................. 455/41.1, 41.2, 455/41.3, 558, 557, 556.1, 90.3, 575.1, 575.7; 307/104; 340/10.1, 10.3, 310.07, 310.01

(56) References Cited

U.S. PATENT DOCUMENTS 5,287,113 A   2/1994 Meier ........................... 342/51

6,624,743 B1 * 9/2003 Ikefuji et al. .............. 340/10.4

FOREIGN PATENT DOCUMENTS

| EP | 0801358 | 10/1997 |
|----|---------|---------|
| GB | 2321726 A | 5/1998 |

* cited by examiner

*Primary Examiner*—Charles Craver
(74) *Attorney, Agent, or Firm*—Lisa K. Jorgenson; E. Russell Tarleton; Seed IP Law Group PLLC

(57) ABSTRACT

An electromagnetic transponder of the type including a parallel oscillating circuit adapted to extracting a supply signal from a radiated field, at least one detuning element controllable from the oscillating circuit, and means for measuring a voltage depending on the voltage level recovered across the terminals of the oscillating circuit, and for activating the detuning element when this voltage exceeds at least a predetermined activation threshold.

22 Claims, 3 Drawing Sheets

ELECTROMAGNETIC TRANSPONDER WITH A FREQUENCY DETUNING

TECHNICAL FIELD

The present invention relates to an electromagnetic transponder, that is, a transceiver (generally mobile) likely to be interrogated contactless and wireless by a unit (generally fixed), called a read and/or write terminal. The present invention more specifically relates to transponders having no independent power supply. Such transponders extract the power supply required by the electronic circuits included therein from the high frequency field radiated by an antenna of the read/write terminal. The present invention applies to such transponders, be they read-only transponders, that is, transponders adapted to operating with a terminal which only reads the transponder data, or read/write transponders, which contain data that can be modified by the terminal.

BACKGROUND OF THE INVENTION

Systems using electromagnetic transponders are based on the use of oscillating circuits, including a winding forming an antenna, on the transponder side and on the read/write terminal side. These circuits are intended to be coupled by a magnetic field when the transponder enters the field of the read/write unit.

FIG. 1 very schematically shows a conventional example of a data exchange system between a read/write unit 1 and a transponder 10 of the type to which the present invention applies.

Generally, terminal 1 is essentially an oscillating circuit formed of an inductance L1 in series with a capacitor C1 and a resistor R1, between an output terminal 2 of an amplifier or antenna coupler (not shown) and a reference terminal 3. The antenna coupler belongs to a circuit 4 for controlling the oscillating circuit and exploiting received data including, among others, a modulator-demodulator and a microprocessor for processing the control signals and the data. In the example shown in FIG. 1, node 5 of the connection of capacitor C1 to inductance L1 forms a terminal for sampling a data signal received from the demodulator. Circuit 4 of the terminal generally communicates with different input/output circuits (keyboard, screen, means of transmission to a provider, etc.) and/or processing circuits, not shown. The circuits of the read/write terminal draw the power required by their operation from a supply circuit (not shown) connected, for example, to the electric supply system.

A transponder 10, intended for cooperating with a terminal 1, essentially includes a parallel oscillating circuit formed of an inductance L2, in parallel with a capacitor C2 between two input terminals 11, 12 of a control and processing circuit 13. Terminals 11, 12 are in practice connected to the input of rectifying means (not shown), the outputs of which form D.C. supply terminals of the circuits internal to the transponder. Since transponder 10 draws its power from the field radiated by terminal 1, it is necessary to provide means 14 for limiting the input voltage of circuit 13 that would otherwise risk being damaged by too high voltages. Means 14 are symbolized in FIG. 1 by a zener diode forming means for clipping the voltage across capacitor C2. Means 14 are shown to be in parallel with capacitor C2. It should however be noted that any other equivalent means may be used and that the clipping means may be placed downstream of the rectifying means.

The oscillating circuit of terminal 1 is excited by a high-frequency signal (for example, 13.56 MHz) intended to be sensed by a transponder 10. When transponder 10 is in the magnetic field of terminal 1, a high-frequency voltage is generated across terminals 11, 12 of the transponder's resonant circuit. This voltage, after being rectified, is intended to provide the supply voltage for the electronic circuits 13 of the transponder. These circuits generally essentially include a microprocessor, a memory, a demodulator of the signals possibly received from terminal 1, and a modulator for transmitting information to the terminal.

The oscillating circuits of the terminal and of the transponder are generally tuned on the frequency of a transmission carrier, that is, their resonance frequency is set to a frequency of, for example, 13.56 MHz. This tuning aims at maximizing the power diffusion to the transponder, generally, a card of credit card format or a tag of still smaller format, integrating the different transponder components.

The high-frequency remote supply carrier transmitted by the terminal is also used as a data transmission carrier. This carrier is generally modulated in amplitude by the terminal according to different coding techniques to transmit the data to the transponder.

FIG. 2 illustrates a conventional example of a data transmission from terminal 1 to a transponder 10. This drawing shows an example of a shape of the excitation signal of antenna L1 for a transmission of a code 0101. The modulation currently used is an amplitude modulation with a 106-kbit/s rate (1 bit is transmitted in approximately 9.4 $\mu$s) much smaller than the frequency (for example, 13.56 MHz) of the carrier coming from the transmission oscillator (period of approximately 74 ns). The amplitude modulation is generally performed with a modulation rate (defined as being the difference of the peak amplitudes (a, b) between two states (1 and 0) divided by the sum of these amplitudes) much smaller than one due to the need for supply of transponder 10. In the example of FIG. 2, the 13.56-MHz carrier is modulated in amplitude, with a 106-kbit/s rate, with a modulation rate tm of, for example, 10%. It should be noted that, whatever the type of modulation used (for example, amplitude, phase, or frequency modulation) and whatever the type of data coding (NRZ, NRZI, BPSK, Manchester, ASK, etc.), the transmission is performed by jumps between two binary levels on the remote supply carrier.

A disadvantage of conventional transponders is that the use of means for clipping the voltage recovered across the oscillating circuit (L2, C2, FIG. 1) is incompatible with an amplitude shift keying that is not in all or nothing. Indeed, if the transponder is relatively close to the terminal, the voltage is likely to be clipped in such a way that the transponder demodulator is then incapable of making out a state 0 from a state 1 due to the modulation rate used. Further, this loss of information can occur without having a clipping level lower than the level of state 0 (b, FIG. 2). It is indeed sufficient for the level at state 1 to be clipped to have a risk of interpretation error by the transponder demodulator.

A known solution to solve this problem consists of limiting the transmission power of the terminal so that a transponder located very close to the terminal does not receive a voltage such that its clipping means are active. A disadvantage of such a solution however is that this then limits the range of the transponder system.

Further, the magnetic fields that the transponders are supposed to withstand are most often imposed by industry or government standards and the application of the standards now in force results in a magnetic field received by the transponder, when its clipping means operate, which is much smaller than the maximum magnetic field that the transponder must be able to withstand according to the standards.

The above problems are more critical still for low power consumption transponders that are tuned on the resonance frequency. Indeed, in such a case, the circuits internal to the transponder provided to have a low consumption are not able to withstand high voltages, so that the clipping means must be sized accordingly.

SUMMARY OF THE INVENTION

The embodiments of the present invention overcome the disadvantages of known electromagnetic transponders as concerns the unwanted effects of the clipping means.

The embodiments of the present invention more specifically aim at providing a novel electromagnetic transponder that can withstand high magnetic fields in the vicinity of a read/write terminal without adversely affecting the recovery of the data transmitted by this terminal. This requires no modification of the read/write terminals and that is thus compatible with existing read/write systems.

The embodiments of the present invention provide a solution that is compatible with the search for a minimum transponder power consumption.

To achieve the foregoing, the present invention provides an electromagnetic transponder of the type including a parallel oscillating circuit adapted to extracting a supply signal from a radiated field, at least one detuning element controllable from the oscillating circuit, and means for measuring a voltage depending on the voltage level recovered across the terminals of the oscillating circuit, and for activating the detuning element when this voltage exceeds at least a predetermined activation threshold.

According to an embodiment of the present invention, the detuning element is formed of a secondary capacitor adapted to being associated in parallel with a main capacitor of the oscillating circuit.

According to an embodiment of the present invention, the secondary capacitor is made controllable by being associated in series with a switch across the terminals of the parallel oscillating circuit.

According to an embodiment of the present invention, the transponder includes at least two individually controllable detuning elements, each detuning element being associated with a predetermined activation threshold dedicated thereto, for being activated when said voltage exceeds this threshold, so that the detuning of the oscillating circuit is performed in stages as the voltage level recovered across the terminals of the oscillating circuit increases.

According to an embodiment of the present invention, the deactivating of the detuning elements is performed simultaneously for all detuning elements, when said voltage falls back under a predetermined deactivation threshold.

According to an embodiment of the present invention, said measurement means are formed with a circuit including, in cascade, a number of measurement stages corresponding to the number of detuning elements plus one.

According to an embodiment of the present invention, all measurement stages have identical structures and receive, on a measurement input terminal, said voltage lowered by a predetermined amount different for each stage.

According to an embodiment of the present invention, said circuit provides control signals of activation and deactivation of the detuning elements via bistable circuits.

According to an embodiment of the present invention, the transponder includes means for clipping the voltage across the terminals of the oscillating circuit, the triggering threshold of which is greater than the activation threshold of the detuning element having the highest threshold.

BRIEF DESCRIPTION OF THE DRAWINGS

The foregoing features and advantages of the present invention will be discussed in detail in the following non-limiting description of specific embodiments in connection with the accompanying drawings.

DETAILED DESCRIPTION OF THE INVENTION

Figure 1:
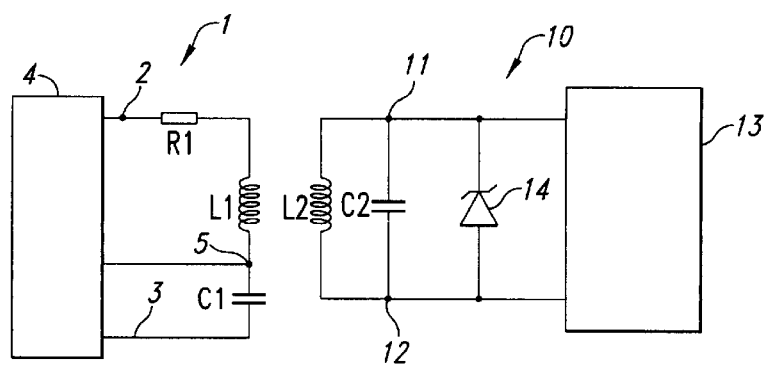
FIGS. 1 and 2, previously described, are intended for showing the state of the art and the problem to solve.

For ease of reference, the same elements have been referred to with the same reference numbers in the different drawings. For clarity, only those elements necessary to the understanding of the present invention have been shown in the drawings and will be described hereafter. In particular, the different circuits of processing and exploitation of the signals received and transmitted by the transponder have not been detailed and are no object of the present invention. It should be noted that the reception circuits are intended for receiving signals in amplitude shift keying with, preferably, a modulation rate under 30%.

A feature of the present invention is to provide a detuning of the oscillating circuit of the transponder when said transponder receives a power such that it would risk clipping the received voltage. Thus, according to the present invention, it is provided to detune the oscillating circuit based on a monitoring of the voltage received by the transponder, to avoid any clipping of this voltage that would risk causing a loss of information. By detuning the oscillating circuit of the transponder, the power taken by said transponder from the field of a reader is reduced and, accordingly, the voltage across this oscillating circuit decreases.

Another feature of the present invention is to provide a capacitive detuning of the transponder's oscillating circuit. Thus, preferably, one or several switchable capacitors are provided in parallel on the capacitor of the transponder's oscillating circuit. The switchable capacitor(s) are controlled by means of a circuit monitoring the voltage recovered by the transponder across its oscillating circuit. Thus, detuning is caused by adding a capacitor to the parallel oscillating circuit, and by lowering the resonance characteristic of this circuit.

Figure 3:
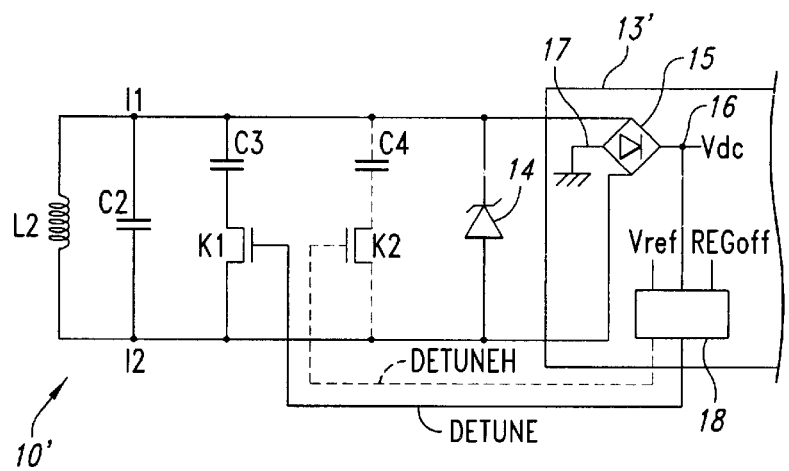
FIG. 3 very schematically and partially shows an embodiment of an electromagnetic transponder according to the present invention.

FIG. 3 very schematically shows an embodiment of a transponder according to the present invention. As previously, such a transponder is based on the use of a parallel oscillating circuit formed of an inductance L2 in parallel with a capacitor C2 across two terminals 11 and 12. The voltage across oscillating circuit L2–C2 is sent onto a circuit 13' containing the data control and exploitation circuits of the transponder. An element of protection against overvoltages 14, symbolized by a zener diode, is mounted in parallel on the oscillating circuit to protect circuit 13' against high voltages recovered by the oscillating circuit. Circuit 13' includes, in particular, a rectifying element 15 (for example, a diode bridge) of the voltage across terminals 11 and 12. D.C. outputs 16 and 17 of rectifying elements 15 provide a D.C. voltage Vdc not only for supplying the other transponder circuits, but also for providing the signals transmitted by the read/write terminal.

According to the present invention, at least one controllable detuning capacitor C3 is associated in parallel with capacitor C2. Capacitor C3 is made controllable by means of a switch K1, for example a MOS transistor, with which it is mounted in series between terminals 10 and 11. Capacitor C3 is intended for modifying the capacitance of the resonant circuit, and thus its resonance frequency. Accordingly, the resonant circuit is detuned with respect to the remote supply carrier. A second controllable detuning capacitor C4 has been symbolized by connections in dotted lines. This optional capacitor C4 is intended for modifying the detuning capacitance by being controllable by means of a second switch K2 (for example, a MOS transistor). Capacitor C4 and switch K2 are connected in series between terminals 11 and 12, and thus in parallel with the oscillating circuit. The sizing of capacitors C3 and C4 depends on the magnitude of the desired detunings and, in particular, on the value of capacitor C2 and on the voltage levels at which the detuning must occur. Switches K1 and K2 are controlled by means of a circuit 18 receiving, in addition to voltage Vdc, a reference voltage Vref and, preferably, a signal for interrupting the control circuit REGOFF. Circuit 18 has the function of measuring voltage Vdc and, according to the value of this voltage with respect to reference voltage Vref, causing the detuning of the oscillating circuit by the turning-on of switch K1, or of switch K2, or of both. The maintaining of a clipping element 14 is a security in case of occurrence of an overvoltage that the detuning would not suffice to attenuate.

Figure 2:
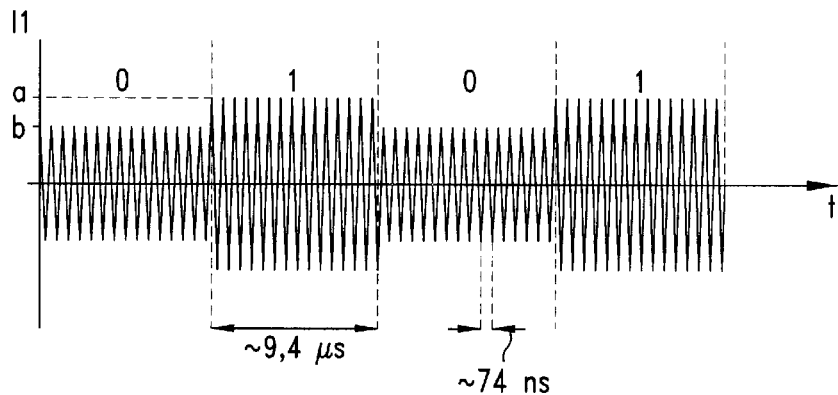

An advantage of the detuning provided by the present invention is that it enables, by being properly sized, avoiding the intervention of clipping element 14 and, accordingly, the clipping of a signal likely to contain data modulated in amplitude as illustrated in FIG. 2. Thus, due to the detuning performed by the present invention that generally occurs when the transponder is very close to a read/write terminal, the data transmitted by the terminal for the transponder are properly received. The preferred use of at least two detuning elements enables maintaining the data reception without adversely affecting the remote supply of the transponder by avoiding too strong an attenuation of the voltage recovered by said transponder as a detuning element is operated. The use of several capacitors C3, C4 enables generating the detuning in stages. The higher the number of detuning elements, the more it is possible to modify by small amounts the voltage received by the transponder. This number must however remain compatible with a small bulk of the transponder. A number of detuning circuits ranging between 1 and 4 is, in the sense of the present invention, a good compromise, a number of 2 being a preferred embodiment.

The detuning of the oscillating circuit is controlled by circuit 18 that compares a voltage depending on the rectified voltage with a reference voltage. In other words, when the rectified voltage reaches a certain level Vdc1 corresponding to a given magnetic field, this correction signal DETUNE is generated to turn on switch K1 so that the rectified voltage drops by a few volts. Preferably, a hysteresis is provided as switch K1 is turned back off, that is, upon a switching in the reverse direction of signal DETUNE, to avoid causing a return of the oscillating circuit in such nominal conditions during a low stage (level b, FIG. 2) of the data modulation coming from the reader. This means that signal DETUNE is not reset as long as the rectified voltage has not fallen under a deactivation threshold (VdcL) that is lower than first activation threshold Vdc1.

Preferably, if the magnetic field keeps on increasing, another control signal DETUNEH is switched to turn on second switch K2 of the correction element as soon as the rectified voltage has reached a second activation threshold Vdc2 that is greater than threshold Vdc1 and that corresponds to a second magnetic field threshold. An additional capacitor is introduced in the resonant circuit, which continues reducing the voltage recovered thereacross and enables the transponder to withstand a greater magnetic field before clipping element 14 starts operating. Preferably, a hysteresis is also provided upon reverse switching of signal DETUNEH so that said signal is not reset as long as the deactivation threshold is not reached.

As indicated hereabove, the detuning of the oscillating circuit preferably remains operative as long as the rectified voltage has not sufficiently dropped, to avoid modifying the transponder configuration during the low stage of the modulation. Similarly, to minimize the power consumption during a starting phase when the magnetic field is not too high, a portion of control circuit 18 intended for the generation of signal DETUNEH is only activated when signal DETUNEH is active, that is, when the power level has already exceeded the first threshold Vdc1.

A control circuit 18 adapted to implementing the functions indicated hereabove can be implemented in different ways as known to or available to those skilled in the art. However, according to another embodiment of the present invention, the power consumption is to be minimized. A control circuit 18 having a minimized consumption at least during periods when the power received by the transponder is lower is then provided. The present invention also minimizes the number of logic gates required to detect the voltage levels and implement the above-mentioned functions.

Figure 4:
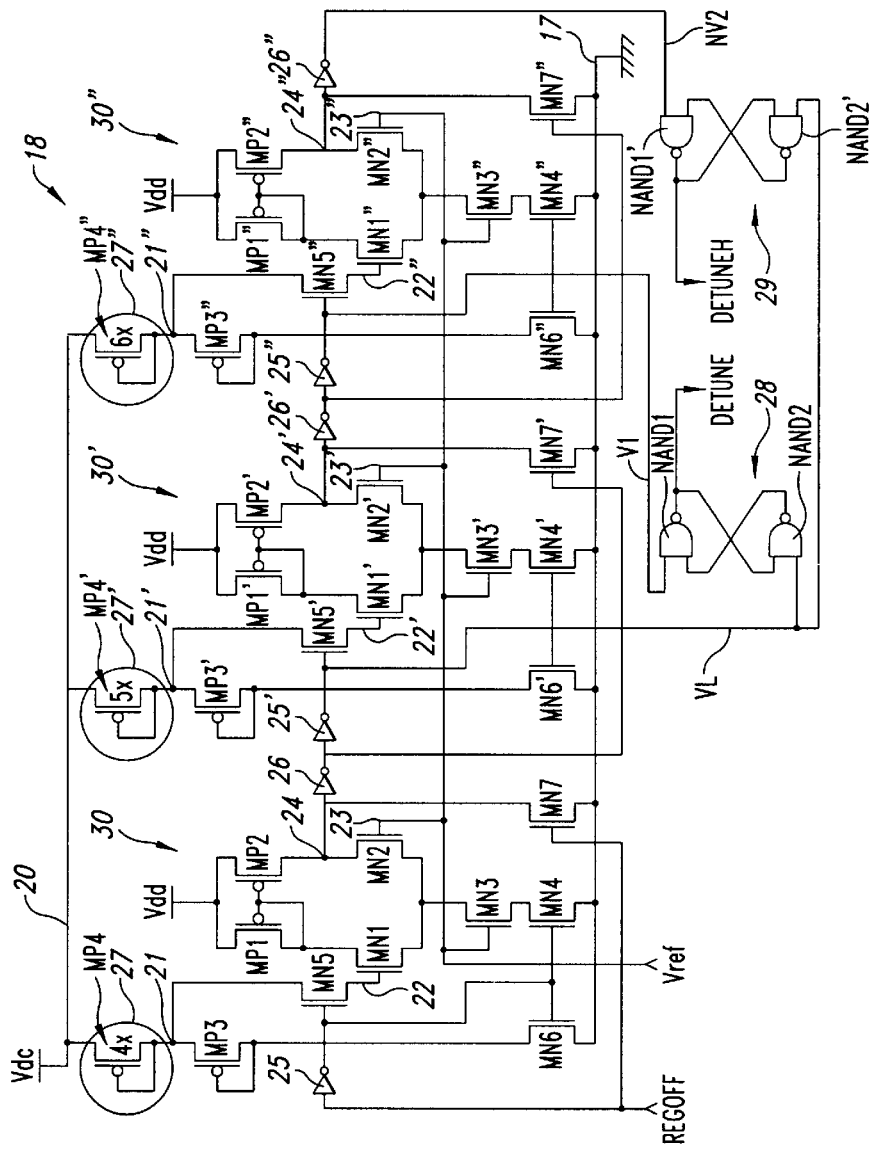
FIG. 4 shows an embodiment of a circuit for controlling detuning means of a transponder according to the present invention.

FIG. 4 shows a detailed embodiment of a control circuit 18 according to this embodiment of the present invention. This circuit receives signals Vref providing a voltage reference as well as a control signal REGOFF for deactivating the operation of the entire circuit as will be seen hereafter. Circuit 18 further receives voltage Vdc across rectifying element 15 (FIG. 3) of the transponder, which is to be compared with the predetermined thresholds. Further, circuit 18 is supplied by a voltage Vdd corresponding, preferably, to a low logic level voltage (for example, approximately 3 volts) much smaller than the circuit supply threshold before clipping, and which corresponds to the minimum operating voltage of the transponder circuits.

According to the present invention, a relatively low reference voltage Vref, that is, much smaller than voltage Vdd, is used. However, the voltage levels likely to be received across bridge 15 are much greater, that is, voltage Vdc can be much greater than voltage Vref. It is accordingly necessary to lower voltage Vdc to properly compare it with the desired reference level.

According to the present invention, this lowering is not performed via a resistive dividing bridge but by means of series-assembled diodes between a line 20 of application of voltage Vdc and respective input terminals 21, 21', 21" of three measurement stages 30, 30', 30" all having identical structures as will be seen hereafter. In the example shown in FIG. 4, three measurement stages 30, 30', and 30" are provided since it is desired to compare voltage Vdc with triggering levels Vdc1 and Vdc2 of signals DETUNE and DETUNEH and with the level of system reset to a nominal position.

The structure of measurement stage 30 will be described hereafter, assuming that, unless otherwise indicated, measurement stages 30' and 30" are strictly identical, and the references of the same elements are respectively assigned therein with an apostrophe (') or a quotation mark (").

Stage 30 is based on the use of a differential measurement structure, a first input 22 of which is intended for receiving the signal to be measured and a second input 23 of which is intended for receiving reference level Vref. Inputs 22 and 23 correspond to the gates of N-channel MOS transistors, respectively MN1 and MN2, the respective drains of which are connected to the drains of P-channel MOS transistors MP1 and MP2, the sources of which are connected to supply voltage Vdd. The gates of transistors MP1 and MP2 are connected to the drain of transistor MP1. The drain of transistor MP2 forms an output terminal 24 of the considered differential stage. The common sources of transistors MN1 and MN2 are connected to a series association of two N-channel MOS transistors MN3 and MN4, the function of which is to control the activating or the deactivating of the differential measurement stage. The drain of transistor MN3 is connected to the sources of transistors MN1 and MN2. Its source is connected to the drain of transistor MN4, the source of which is connected to ground 17. The gate of transistor MN3 receives signal Vref and has the function of disconnecting the measurement stage and suppressing any consumption therefrom if reference voltage level Vref is not present. It should be noted that reference level Vref must thus be compatible with the series voltage drops of transistors MN3 and MN4. In the example of a voltage Vref on the order of 1.5 volts, this voltage is chosen to correspond to a little more than two threshold voltages of N-channel MOS transistors. Transistor MN4 receives on its gate a control signal corresponding, for first stage 30, to a signal depending on signal REGOFF of general control of the detuning circuit. This signal is applied thereto via an inverter 25, the input of which receives signal REGOFF that, in this example, is considered as being active in the low state. In other words, when signal REGOFF is low, the gate of transistor MN4 is brought to a high level, which turns it on. This state is, for first stage 30, the state in which circuit 18 is found as soon as the transponder is activated by the reception of a remote supply signal. As soon as signal Vref is present, transistor MN3 is also turned on so that differential stage 30 is activated. Input 21 of the voltage to be measured is connected to gate 22 of transistor MN1, forming the measurement input of stage 30, via an N-channel MOS transistor MN5 having the function of isolating input 21 of differential stage 30 if signal REGOFF is inactive, that is, high. The gate of transistor MN5 is for this purpose connected to the output of inverter 25 so that transistor MN5 is on when signal REGOFF is low. Input terminal 21 is connected to ground 17 via a series association of a diode-mounted P-channel MOS transistor MP3 (its gate being connected to its drain while its source is connected to terminal 21) and of an N-channel MOS transistor MN6, the gate of which is connected to the output of inverter 25. Transistor MN6 is turned on when signal REGOFF is active, that is, low. For the rest of the time, it disconnects input branch 21 of the measurement stage. Thus, any consumption in the measurement stage is suppressed when signal REGOFF is inactive (high). The function of transistor MP3 is to compensate the voltage drop in transistor MN3 of the differential stage. Signal REGOFF is further used to control an N-channel MOS transistor MN7, the source of which is grounded and the drain of which is connected to output 24 of the differential stage to force the output to the low state when signal REGOFF is inactive.

The structure indicated hereabove is that reproduced in stages 30' and 30", by only modifying the distribution of the circuit activation and deactivation control signals. This modification does not concern signal Vref, which is thus sent onto the gates of transistors MN3' and MN3" as well as onto those of transistors MN2' and MN2".

The gates of transistors MN5', MN4', and MN6', respectively MN5", MN4" and MN6", receive the output signals of inverters 25' and 25" of activation of the stages, respectively 30' and 30". The input signals of inverters 25' and 25" are sent to the respective gates of transistors MN7' and MN7". Since the structures of stages 30' and 30" are identical to those of stage 30, the activation signal (input of inverter 25', 25") is active in the low state. This signal comes, according to the present invention, from the output of the preceding stage to only activate a subsequent measurement stage if the preceding measurement stage is active. For this purpose, output 24 of stage 30 is connected to the input of inverter 25' via an inverter 26 and output 24' of stage 30' is connected to the input of inverter 25" via an inverter 26'.

Inputs 21, 21', and 21" of the measurement stages receive voltage levels that, while depending on voltage Vdc, are different from one another.

According to the present invention, each input terminal 21, 21' or 21" is connected to line 20 via a voltage step-down device, respectively 27, 27', and 27", preferably formed of several series-associated diodes. The number of series-associated diodes is different according to the concerned stage. Thus, the voltage level compared with reference level Vref corresponds to level Vdc decreased by a number of diode voltage drops that is different according to the concerned measurement stage. In the example shown in FIG. 4, four diodes are associated in series between line 20 and terminal 21, five diodes are associated in series between line 20 and terminal 21', and six diodes are associated in series between line 20 and terminal 21". These diodes are, preferably, formed with diode-mounted P-channel MOS transistors MP4, MP4', and MP4", that is, the respective gates of which are connected to their respective drains, the source of a first transistor being connected to line 20 while the drain of a last transistor is connected to the input terminal, respectively 21, 21', or 21". To simplify the diagram of FIG. 4, a single transistor has been shown in each step-down device and the number of series-associated transistors has been indicated in front of the step-down element.

Outputs 24, 24' and 24" are preferably exploited after inversion or double inversion. The function of these inversions is to reshape (logic states) the output signals before their exploitation by a logic block providing signals DETUNE and DETUNEH. Thus, the output of first stage 30 is sampled at the output of inverter 25' that gives back a signal VL corresponding to the state of output 24. The output of stage 30' is sampled at the output of inverter 25" that gives back a signal V1 corresponding to the state of terminal 24'. And the output of third stage 30" is sampled from the output of an inverter 26" that gives back a signal NV2 corresponding to the inverse of the state of terminal 24". The exploitation of signals VL, V1, and NV2 is performed, for example, by means of two RS flip-flops 28, 29 that give back output signals DETUNE and DETUNEH of circuit 18. Each flip-flop 28 or 29 is, for example, formed of two NAND-type logic gates (NAND1 and NAND2 for flip-flop 28, NAND1' and NAND2' for flip-flop 29).

Gate NAND1 receives, on a first input, signal V1 and, on a second input, the output of gate NAND2, a first input of which receives the output of gate NAND1 and a second of which receives signal VL. The output of gate NAND1 provides signal DETUNE. A first input of gate NAND1' receives signal NV2 and a second input receives the output of gate NAND2', a first input of which receives the output of gate NAND1' and a second input of which receives signal VL. The output of gate NAND1' forms the output of flip-flop 29 providing signal DETUNEH.

It should be noted that the hysteresis of each stage essentially depends on its transistors MN1 and MN2 (respectively MN1' and MN2', MN1" and MN2"). An unbalance of the gate voltages of transistors MN1 and MN2 generates a difference in the currents flowing through these transistors. Node 24 (respectively 24' and 24") thus charges or discharges accordingly according to the direction of the unbalance. The time required depends on the current in transistors MN1 and MN2. The hysteresis thus depends on transistors MN1 and MN2 and, accessorily, on transistors MP1, MP2, and on current source MN3.

Figures 5A, 5B, 5C, 5D, 5E, 5F:
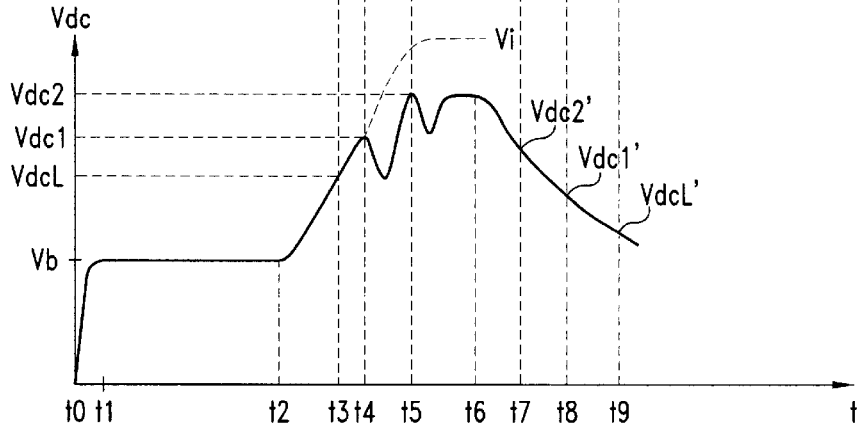
FIGS. 5A to 5F illustrate, in the form of timing diagrams, the operation of a transponder according to the present invention.

FIGS. 5A to 5F illustrate the operation of a circuit for controlling detuning elements according to the present invention. These drawings show, in the form of timing diagrams, an example of shape of signals characteristic of circuit 18 (FIG. 4) according to voltage Vdc. FIG. 5A shows signal VL. FIG. 5B shows signal V1. FIG. 5C shows signal NV2. FIGS. 5D and 5E respectively show signals DETUNE and DETUNEH. FIG. 5F shows an example of shape of voltage Vdc.

When the transponder comes close to a terminal transmitting a signal by means of its oscillating circuit, it receives a power of remote supply by the resonant circuit (FIG. 3) in which capacitors C3 and C4 have no action for the moment. Voltage Vdc increases (times t0 to t1) and it is assumed that the field remains stable for a certain duration (times t1 to t2), for example, corresponding to a period during which the transponder is at equal distance from the terminal. Level Vb of voltage Vdc is then also stable between times t1 and t2. It is assumed that signal REGOFF, which is active in the low state as soon as the transponder is activated, is in this active state from a voltage threshold lower than level Vb.

From time t2 on, voltage level Vdc increases, for example, due to the transponder coming closer to the read/write terminal. At a time t3, voltage Vdc reaches threshold VdcL as it increases. It should indeed be noted that threshold VdcL is different according to whether voltage Vdc increases or decreases, due to the hysteresis provided by the circuit of the present invention. VdcL, Vdc1, and Vdc2 will be used to designate the respective thresholds when voltage Vdc increases, and VdcL', Vdc1', and Vdc2' will be used for the respective thresholds when voltage Vdc decreases. Thus, at time t3, signal VL switches high (1) and activates stage 30' of comparison of voltage Vdc with threshold Vdc1. Stage 30 remains active since signal REGOFF has not disappeared. It is assumed that voltage Vdc continues increasing and reaches threshold Vdc1 at a time t4. At this time t4, signal V1 switches high, and so does signal DETUNE provided by bistable 28. As a result, capacitor C3 is introduced in the resonant circuit that is slightly detuned, which makes voltage Vdc drop. Assuming that the transponder continues approaching the terminal, voltage Vdc continues increasing, but from a level lower than level Vdc1. Assuming that at a time t5, voltage level Vdc reaches threshold Vdc2, signal NV2 that was initially high switches low, which places capacitor C4 in parallel in the transponder's resonant circuit and, accordingly, this causes a new drop of voltage Vdc to a level lower than threshold Vdc2. FIG. 5F illustrates the unmodified shape Vi that voltage Vdc would have if capacitors C3 and C4 were not placed in parallel. It should be noted that stage 30" has only been activated when signal V1 has switched high. Accordingly, the consumptions introduced by the measurement circuit of the present invention are progressive and intervene as voltage Vdc increases.

Assuming a decrease of voltage Vdc from a time t6, this decrease will cause the successive opening of switches K2 and K1 at times t7 and t8 that correspond to voltage Vdc crossing thresholds Vdc2' and Vdc1' as it decreases. At a time t9, voltage Vdc reaches threshold VdcL'. In the example shown in FIGS. 5A to 5F, thresholds Vdc2' and Vdc1' are respectively slightly lower than thresholds Vdc1 and VdcL. These thresholds are only separated by one diode voltage drop corresponding to the threshold differences of elements 27, 27' and 27".

Signals DETUNE and DETUNEH only switch back to state 0 at time t9, that is, from the time when voltage Vdc has sufficiently dropped to avoid any risk of confusion of a drop of voltage Vdc with an amplitude modulation at the low level of the remote supply signal. At time t9, the detuning is suppressed (signals DETUNE and DETUNEH are reset). Voltage Vdc increases to reach a level higher than VdcL and signal VL (FIG. 5A) switches high after having switched low. This is of no importance since signals DETUNE and DETUNEH will only switch back to state 1 after thresholds Vdc1 and Vdc2 have been respectively reached.

It should be noted that in the timing diagrams of FIGS. 5A to 5F, no account has been taken of the propagation delays of the signals in circuit 18, nor of the parasitic fluctuations of the levels of the logic signals.

As a specific example of an embodiment, a circuit in which the thresholds will respectively have the following values may be provided. VdcL=8 volts, VdcL'=6.3 volts, Vdc1=9.6 volts, Vdc1'=7.8 volts, Vdc2=11.2 volts, and Vdc2'=9.3 volts. In this example, signal DETUNE switches high when voltage Vdc exceeds, as it increases, the 9.6-volt level, and signal DETUNEH switches high when voltage Vdc increases to exceed the 11.2-volt level. However, signals DETUNE and DETUNEH are only reset to the low state when voltage Vdc drops under the 6.3-volt level. Thus, the 10% amplitude shifts linked to the remote supply modulation do not affect the detuning of the resonant circuit. The increase of the number of diodes MP4 via which voltage Vdc is applied slightly modifies the variation amplitude required to generate an identical effect of the stage comparator. This amplitude modification is typically on the order of 0.1 volt per additional diode. Of course, the respective values of the thresholds and of the capacitances will be adapted according to the application and, in particular, according to the modulation rate of the remote supply signal.

An advantage of the embodiments of the present invention is that it enables avoiding a loss of information due to a clipping of the remote supply signal when a transponder comes close to a read/write terminal or receives too strong a magnetic field.

Another advantage is that the detuning performed by the transponder does not affect the remote supply due to the hysteresis provided to deactivate the detuning means.

A further advantage is that the detuning control circuit is particularly economical due its successive activation by stage as the voltage level received by the transponder increases. In this regard, it should be noted that the consumption of the control circuit of the present invention is maximum when the power received by the transponder is also maximum.

Yet another advantage of the present invention is that it requires no modification of the read/write terminal and is thus compatible with conventional readers.

Of course, the present invention may have various alterations, modifications, and improvements which will readily occur to those skilled in the art. In particular, the sizing of the different components may be modified according to the application and to the desired detuning magnitudes. Further, the number of detuning elements may be modified according to the number of stages desired for the detuning control of the transponder's resonant circuit. Further, other control circuits than that described in relation with FIG. 4 may be provided. For example, a measurement upstream of the rectifying means may be provided by means of a circuit accepting an A.C. voltage. The circuit of FIG. 4 however is a preferred embodiment since it minimizes the number of logic gates and the circuit consumption.

Among the applications of the present invention are contactless smart cards (for example, identification cards for access control, electronic purse cards, cards for storing information about the card holder, consumer fidelity cards, toll television cards, etc.), and product identification tags (for example, anti-theft tags of self-service store products, tags of routing system parcels, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electromagnetic transponder including:
   a parallel oscillating circuit adapted to extracting a supply signal from a radiated field;
   at least two individually controllable detuning elements; and
   means for measuring a voltage depending on the voltage level recovered across the terminals of the oscillating circuit, and for selectively activating the detuning elements when the measured voltage exceeds a predetermined activation threshold specific of each detuning element;
   wherein said measurement means are formed with a circuit including, in cascade a number of measurement stages corresponding to the number of detuning elements plus one, all of said measurement stages comprise identical structures and receive, on a measurement input terminal, said measured voltage lowered by a predetermined amount that is different for each stage.

2. The transponder of claim 1, wherein the measurement stages receive said measured voltage through serially connected diodes, the number of serial diodes being distinct for each stage.

3. The transponder of claim 1, wherein the oscillating circuit is detuned by steps while as the voltage level recovered across the terminals of the oscillating circuit increases, each measurement stage receiving an activation signal activating on further measurement stage only if the former measurement stage is active.

4. The transponder of claim 1, wherein the deactivating of the detuning elements is performed simultaneously for all detuning elements when said voltage falls below a predetermined deactivation threshold.

5. The transponder of claim 1, wherein said circuit provides control signals of activation and deactivation of the detuning elements via bistable circuits.

6. The transponder of claim 1, further comprising means for clipping the voltage across the terminals of the oscillating circuit, the triggering threshold of which is greater than the activation threshold of the detuning element having the highest threshold.

7. The transponder of claim 1, wherein said detuning element is formed of a secondary capacitor associated in parallel with a main capacitor of the oscillating circuit.

8. The transponder of claim 7, wherein the secondary capacitors are made controllable by being associated in series with a switch across the terminals of the parallel oscillating circuit.

9. A transponder, comprising:
   a parallel receiving circuit configured to receive a radiated electromagnetic field and to output a supply signal in response thereto; and
   a control circuit coupled to the receiving circuit and configured to measure the supply signal and to de-tune the receiving circuit using a plurality of individual measuring and de-tuning stages when the supply signal rises to a predetermined activation threshold, all of the measuring and de-tuning stages having identical structures and their own predetermined activation threshold, and each measuring and de-tuning stage receiving as input the supply signal lowered by a predetermined amount specific to each measuring and detuning stage.

10. The transponder of claim 9, wherein each de-tuning stage corresponding to increases in the voltage of the supply signal.

11. The transponder of claim 10, wherein the control circuit is configured to de-tune the receiving circuit in first and second de-tuning stages, the first de-tuning stage corresponding to a first activation threshold and the second de-tuning stage corresponding to a second activation threshold.

12. The transponder of claim 11, wherein the second activation threshold corresponds to a supply signal having a voltage that is greater than a voltage of the supply signal at the first activation threshold.

13. The transponder of claim 10, wherein the control circuit is further configured to re-tune the receiving circuit when the voltage of the supply signal reaches a predetermined voltage level.

14. An electromagnetic transponder system, comprising:
   a source of radiated electromagnetic field signals;
   a receiver configured to receive the radiated electromagnetic field signals and to generate a supply voltage therefrom; and
   a control circuit coupled to the receiver circuit and configured to receive the supply voltage and to de-tune the receiver circuit with a plurality of de-tuning circuits when the supply voltage reaches a predetermined level, and to re-tune the receiver circuit when the supply voltage is below the predetermined level, each de-tuning circuit having its own identical structure and predetermined activation voltage threshold, and each de-tuning circuit receiving as input the supply voltage lowered by a predetermined amount specific to each de-tuning circuit.

15. The system of claim 14, wherein each de-tuning circuit is coupled to a measurement circuit.

16. The system of claim 15, wherein each de-tuning circuit comprises a capacitor selectively coupled through a switch to the receiver circuit in response to a switching signal received from the measuring circuit.

17. The circuit of claim 14, wherein the plurality of de-tuning circuits comprises at least first and second de-tuners coupled to the measuring circuit through first and second switches, respectively, to couple and de-couple the respective de-tuning circuit to the receiver circuit in response to first and second switching signals received from the measuring circuit, the measuring circuit comprising a plurality of measurement stages in cascade corresponding to the number of de-tuning circuits plus one and configured to generate the first switching signal in response to the supply voltage reaching a first threshold voltage and to generate the second switching signal in response to the supply voltage reaching a second threshold voltage that is greater than the first threshold voltage.

18. The system of claim 17, wherein the measuring circuit is configured to stop generating the first and second switching signals simultaneously when the supply voltage falls below a cut-off voltage level.

19. The system of claim 18, wherein the cut-off voltage level is the predetermined level.

20. A method of tuning an electromagnetic transponder system, comprising:

receiving radiated electromagnetic field signals at a receiver circuit and generating a supply voltage therefrom;

measuring the supply voltage; and tuning the receiver circuit in response to the measured voltage using individual tuning elements with a control signal, each tuning element having an identical structure and its own predetermined activation voltage threshold, and each tuning element receiving as input the measured voltage that is lowered by a predetermined amount specific to each tuning element.

21. The method of claim 20, wherein tuning the receiver circuit comprises activating each tuning element with its own activation voltage threshold.

22. The method of claim 21, wherein tuning the receiver circuit comprises de-activating each tuning element.

* * * * *

UNITED STATES PATENT AND TRADEMARK OFFICE
CERTIFICATE OF CORRECTION

PATENT NO. : 6,799,015 B1
DATED : September 28, 2004
INVENTOR(S) : Vineet Tiwari It is certified that error appears in the above-identified patent and that said Letters Patent is hereby corrected as shown below:

Title page,
Item [56], References Cited, U.S. PATENT DOCUMENTS, insert the following:

| | | | |
|---|---|---|---|
| -- 5,070,500 | 12/1991 | Horinouchi et al. | 365/189.02 |
| 5,132,993 | 7/1992 | Nishiura et al. | 377/76 |
| 5,293,400 | 3/1994 | Monod et al. | 375/219 |
| 5,345,231 | 9/1994 | Koo et al. | 340/870.31 |
| 5,450,088 | 9/1995 | Meier et al. | 342/51 |
| 5,892,300 | 4/1999 | Rydval | 307/104 |
| 6,272,321 | 8/2001 | Bruhnke et al. | 455/41.1 |
| 6,356,738 | 3/2002 | Schneider et al. | 455/41.2 |
| 6,415,134 | 7/2002 | Merlin | 455/41.1 --. |

Signed and Sealed this

Tenth Day of January, 2006

JON W. DUDAS
*Director of the United States Patent and Trademark Office*